United States Patent
Yamamoto et al.

(10) Patent No.: US 7,229,373 B2
(45) Date of Patent: Jun. 12, 2007

(54) ENGINE TORQUE CONTROL SYSTEM

(75) Inventors: Masahiro Yamamoto, Fuji (JP); Yoshihisa Kodama, Fuji (JP); Shigeki Shimanaka, Fuji (JP); Hiroyasu Tanaka, Fuji (JP)

(73) Assignee: Jatco Ltd (JP)

( * ) Notice: Subject to any disclaimer, the term of this patent is extended or adjusted under 35 U.S.C. 154(b) by 652 days.

(21) Appl. No.: 10/787,012

(22) Filed: Feb. 25, 2004

(65) Prior Publication Data

US 2004/0171444 A1   Sep. 2, 2004

(30) Foreign Application Priority Data

Feb. 27, 2003   (JP)   ............... 2003-050806

(51) Int. Cl.
*F16H 61/02*   (2006.01)
*F16H 61/12*   (2006.01)

(52) U.S. Cl. ......................................... 474/28; 474/18

(58) Field of Classification Search ................ 474/18, 474/28; 477/43–49; 701/34–36, 54, 63, 701/95

See application file for complete search history.

(56) References Cited

U.S. PATENT DOCUMENTS

| | | | | |
|---|---|---|---|---|
| 4,637,279 A | * | 1/1987 | Itoh et al. | 477/43 |
| 4,781,655 A | * | 11/1988 | Tezuka | 474/28 |
| 5,964,813 A | * | 10/1999 | Ishii et al. | 701/35 |
| 6,104,976 A | * | 8/2000 | Nakamura | 701/95 |
| 6,123,642 A | * | 9/2000 | Saito et al. | 477/3 |
| 6,532,410 B2 | * | 3/2003 | Sigg et al. | 701/51 |
| 6,723,014 B2 | * | 4/2004 | Shinso et al. | 474/18 |
| 2004/0192494 A1 | * | 9/2004 | Ozeki et al. | 477/115 |
| 2004/0235615 A1 | * | 11/2004 | Deguchi | 477/43 |

FOREIGN PATENT DOCUMENTS

| | | | | |
|---|---|---|---|---|
| JP | 02-253036 A | * | 10/1990 | 474/28 |
| JP | 2001-182811 A | * | 7/2001 | |
| JP | 2003-28287 | * | 1/2003 | |
| JP | 2003-343709 A | * | 12/2003 | |

* cited by examiner

*Primary Examiner*—Marcus Charles
(74) *Attorney, Agent, or Firm*—Rossi, Kimms & McDowell LLP

(57) ABSTRACT

In case information such as an actual gear ratio is not stored in an EEPROM 28 due to a trouble of a backup power source 29 or like when an initialization operation of a step motor 27 is performed at the time of start of a vehicle or during stoppage of the vehicle, an output torque of an engine is limited before the initialization operation. Thereby, even if an accelerator is depressed during the initialization operation of the step motor 27 in which a sufficient primary pulley pressure cannot be ensured, the output torque of the engine is limited, so that torque inputted to a V-belt type continuously variable transmission is small and slippage does not occurs between the primary pulley and a secondary pulley.

5 Claims, 3 Drawing Sheets

ENGINE TORQUE CONTROL SYSTEM

BACKGROUND OF THE INVENTION

1. Field of the Invention

The present invention relates to a torque control system for an engine which is connected to a V-belt type continuously variable transmission.

2. Description of the Prior Art

Conventionally, as a continuously variable transmission for a vehicle, there is, for example, a continuously variable transmission with a V-belt. Generally, in the continuously variable transmission, a gear ratio of the vehicle such as an automobile is continuously controlled by supplying a hydraulic pressure (hereinafter referred to as a primary pulley pressure) which is obtained by regulating a line pressure as an original pressure with a shift control valve to a cylinder chamber of a primary pulley, increasing and reducing the primary pulley pressure with the shift control valve to change a groove width of the primary pulley and changing a radius ratio between the primary pulley and a secondary pulley. This shift control valve is connected to the vicinity of a middle of a shift link constituting a mechanical feedback mechanism, and a movable flange of the primary pulley and a step motor that is a shift actuator are respectively connected to both ends of the shift link. In order to prevent generation of disagreement between an operating position of the step motor for stroking the shift control valve to a position corresponding to a desired shift command value and a command value to the step motor, an initialization operation of the step motor is performed when the vehicle is stopped or an engine is started.

An example of the initialization operation of the step motor in this conventional system will be described. When an ignition switch is turned on, a motor initializing means drives the step motor to a hardware limit position in one direction and thereafter returns the motor to a reference position in the other direction, and after the motor initialing means completes the above initialization operation of the step motor, a command value to the step motor is initialized to a value corresponding to the reference position. This causes the command value to accord with the operating position of the step motor with a high precision, whereby shift control is performed accurately. (see Patent Document 1: Japanese Patent Application Laid-Open Publication No. 8-178063)

Moreover, since it is necessary to actuate the step motor from a current motor operating position to the hardware limit position in the one direction when the initialization operation of the step motor is performed, the continuously variable transmission has an EEPROM capable of storing the current motor operating position of the step motor and pulley ratio as pulley information. The EEPROM is provided with a backup power source for writing data and receives electric power supply from the backup power source to store the pulley information even if a power source of the vehicle is turned off.

However, it is impossible to write the pulley information in the EEPROM when trouble of the backup power source disenables electric power supply. Since the current motor operating position is therefore unclear, when the motor is driven to the hardware limit position of the one direction in the initialization operation of the step motor, the present operating position of the motor is presumed to be at a farthest position from the hardware limit position, and the step motor is driven for a time equal to time required until the operating position of the step motor moves from the presumed position to the hardware limit position. This causes the increase of time for performing the initialization operation of the step motor.

Since the step motor is thus operated to a direction in which the hardware limit position of the one direction, that is, the pulley ratio reaches a lowest value Lo during the initialization operation of the step motor, the primary pulley pressure is reduced because of communication with a drain side. If the driver deeply depresses the accelerator at that time, the short of the primary pulley pressure causes slippage of a belt, and the durability of the belt is degraded.

SUMMARY OF THE INVENTION

The present invention has been made in view of the aforementioned problem, and its object is to provide a shift control system for a continuously variable transmission in which slippage of a belt is prevented even when the driver deeply depresses the accelerator during initialization operation of a step motor in case where no pulley information is stored in an EEPROM because of a trouble of an backup electric power source or the like.

Therefore, the present invention provides a torque controlling system for use with a V-belt type continuously variable transmission for a vehicle in which a V-belt is wound between a primary pulley of an input side connected to an engine and a secondary pulley of an output side, a primary pulley pressure acting on the primary pulley and a secondary pulley pressure acting on the secondary pulley are generated respectively by using a line pressure as an original pressure, and a shift actuator is set to an operating position corresponding to a target gear ratio, whereby a differential pressure is generated between the primary pulley pressure and the secondary pulley pressure to change widths of V-shaped grooves of the primary pulley and the secondary pulley so that an actual gear ratio that is obtained from speed ratios of the primary pulley and the secondary pulley becomes equal to the target gear ratio, comprising: a storing section for storing a pulley information immediately before the vehicle is stopped; storage determining means for determining whether the pulley information is stored in the storing section, and torque limiting means for performing a limitation of an input torque to the primary pulley, wherein in case the storage determining means determines that the pulley information is not stored in the storing section before an initialization operation to set the shift actuator to a reference position is performed, the limitation of the input torque to the primary pulley is performed by the torque limiting means.

According to the present invention, in case the storage determining means determines that the pulley information is not stored in the storing section when the initialization operation of the shift actuator is performed, the output torque of the engine is limited by the torque limiting means. Thereby, since the output torque of the engine is limited even if the accelerator is depressed during the initialization operation of the shift actuator in which a sufficient primary pulley pressure is not retained, the torque inputted to the V-belt type continuously variable transmission is reduced, and no slippage occurs in the V-belt wound between the primary pulley and the secondary pulley.

The above and further objects and features of the invention will be more fully apparent from the following description when the same is considered with reference to the accompanying drawings.

DETAILED DESCRIPTION OF THE PREFERRED EMBODIMENT

A preferred embodiment of the present invention will be described hereinbelow.

Figure 1:
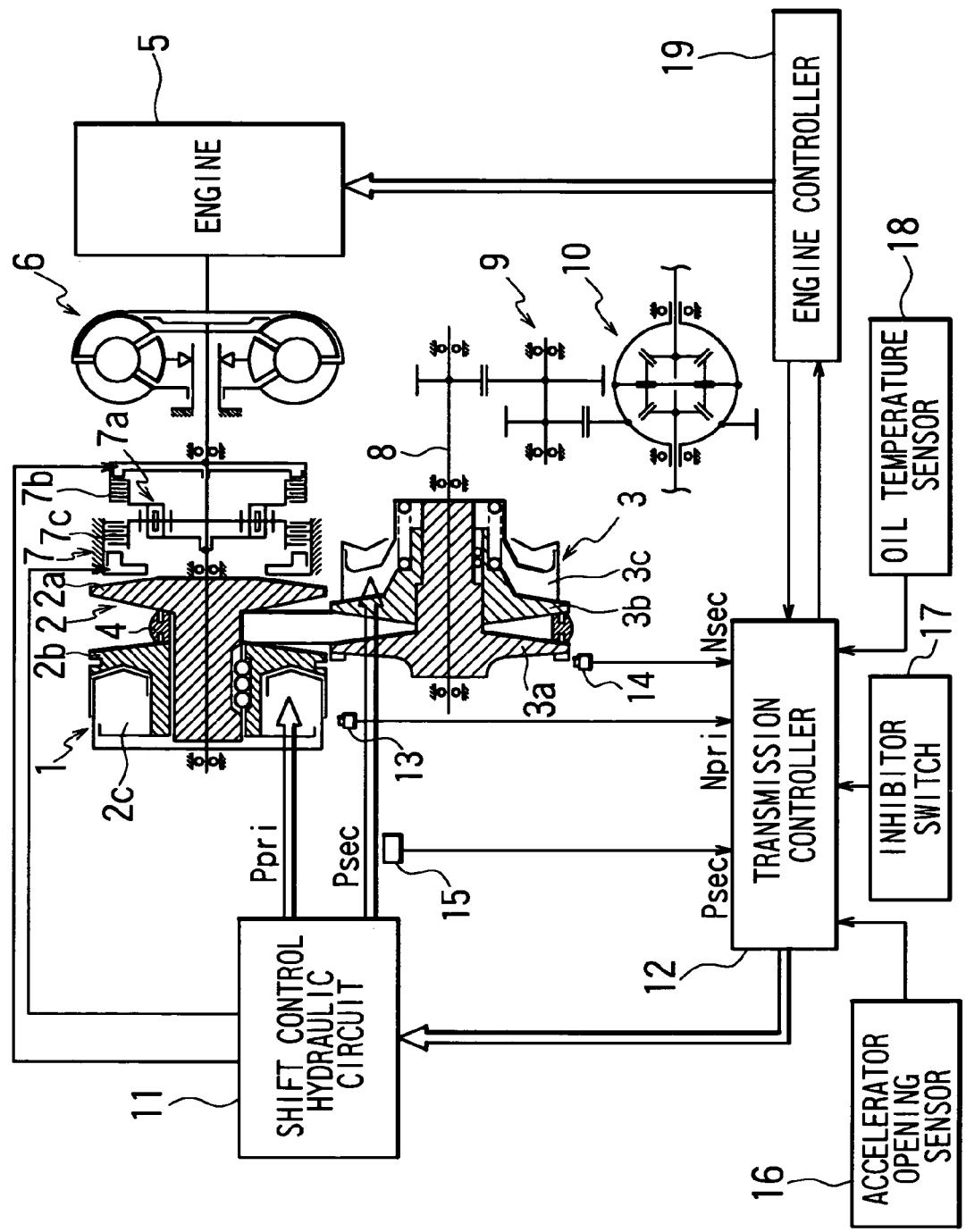
FIG. 1 is a diagram showing an embodiment according to the present invention.

FIG. 1 shows a schematic construction of a V-belt type continuously variable transmission.

A primary pulley 2 and a secondary pulley 3 are arranged so that their V-shaped grooves are aligned, and a V-belt 4 is wound around the V-shaped grooves of the pulleys 2, 3. An engine 5 that is a driving source is arranged coaxially with the primary pulley 2, and a torque converter 6 having a lockup mechanism and a forward/reverse switching mechanism 7 are sequentially provided between the engine 5 and the primary pulley 2. The torque converter 6, the forward/reverse switching mechanism 7, the primary pulley 2, the secondary pulley 3 and the V-belt 4 constitutes a V-belt type continuously variable transmission 1.

The forward/reverse switching mechanism 7 is comprised mainly of a double-pinion planetary gear mechanism 7a and includes a sun gear connected through the torque converter 6 to the engine 5 and a carrier connected to the primary pulley 2. The forward/reverse switching mechanism 7 has a forward clutch 7b directly connecting the sun gear and the carrier of the double-pinion planetary gear mechanism 7a and a backward brake 7c capable of fixing a ring gear and transmits input speed, which is sent through the torque converter 6 from the engine 5, to the primary pulley 2 when the forward clutch 7b is engaged. Further, when the backward brake 7c is engaged, the forward/reverse switching mechanism 7 reverses and reduces an input speed transmitted through the torque converter 6 from the engine 5 and transmits this input speed to the primary pulley 2.

Rotation of the primary pulley 2 is transmitted through the V-belt 4 to the secondary pulley 3, and then rotation of the secondary pulley 3 is transmitted through an output shaft 8, a gear set 9 and a differential gear 10 to not-shown wheels. In order to make it possible to change a rotation transmission ratio (gear ratio) between the primary pulley 2 and the secondary pulley 3 during the above-mentioned power transmission, one of flanges defining the V-shaped grooves of the primary pulley 2 and the secondary pulley 3 is used as fixed flanges 2a, 3a, and other flanges 2b, 3b are used as movable flanges capable of being displaced in the axial direction. These movable flanges 2b, 3b are biased to the fixed flanges 2a, 3a by supplying a primary pulley pressure Ppri and a secondary pulley pressure Psec, which are obtained by using after-mentioned line pressure as an original pressure, to a primary pulley chamber 2c and a secondary pulley chamber 3c, whereby the V-belt 4 is frictionally engaged both between the fixed flange 2a and the movable flange 2b and between the fixed flange 3a and the movable flange 3b to enable the above-mentioned transmission of power between the primary pulley 2 and the secondary pulley 3.

This embodiment especially aims to miniaturize the size of V-belt type continuously variable transmission by equalizing a pressure receiving area of the primary pulley chamber and that of the secondary pulley chamber and by preventing one of the pulleys 2, 3 from having a large diameter.

In a gear shift (speed change), differential pressure between the primary pulley pressure Ppri and the secondary pulley pressure Psec which are generated according to a target gear ratio changes V-shaped grooves of the pulleys 2, 3, and a winding radius of the V-belt 4 with respect to these pulleys 2, 3 is continuously changed, whereby the target gear ratio can be realized.

Outputs of the primary pulley pressure Ppri and the secondary pulley pressure Psec are controlled by a shift control hydraulic circuit 11, together with outputs of engagement hydraulic pressures of the forward clutch 7b to be engaged at the time of selecting a forward running range and the backward brake 7c to be engaged at the time of selecting a backward running range. This shift control hydraulic circuit 11 performs this control in response to a signal from a transmission controller 12.

Therefore, the transmission controller 12 receives a signal from a primary pulley rotation sensor 13 for detecting a primary pulley revolution Npri, a signal from a secondary pulley rotation sensor 14 for detecting a secondary pulley revolution Nsec, a signal from a secondary pulley pressure sensor 15 for detecting the secondary pulley pressure Psec, a signal from an accelerator opening sensor 16 for detecting an accelerator depression amount APO, a selection range signal from an inhibitor switch 17, a signal from an oil temperature sensor 18 for detecting a sift operation oil temperature TMP and signals (engine speed or fuel injection time) concerning a transmission input torque from an engine controller 19 for controlling the engine 5.

Figure 2:
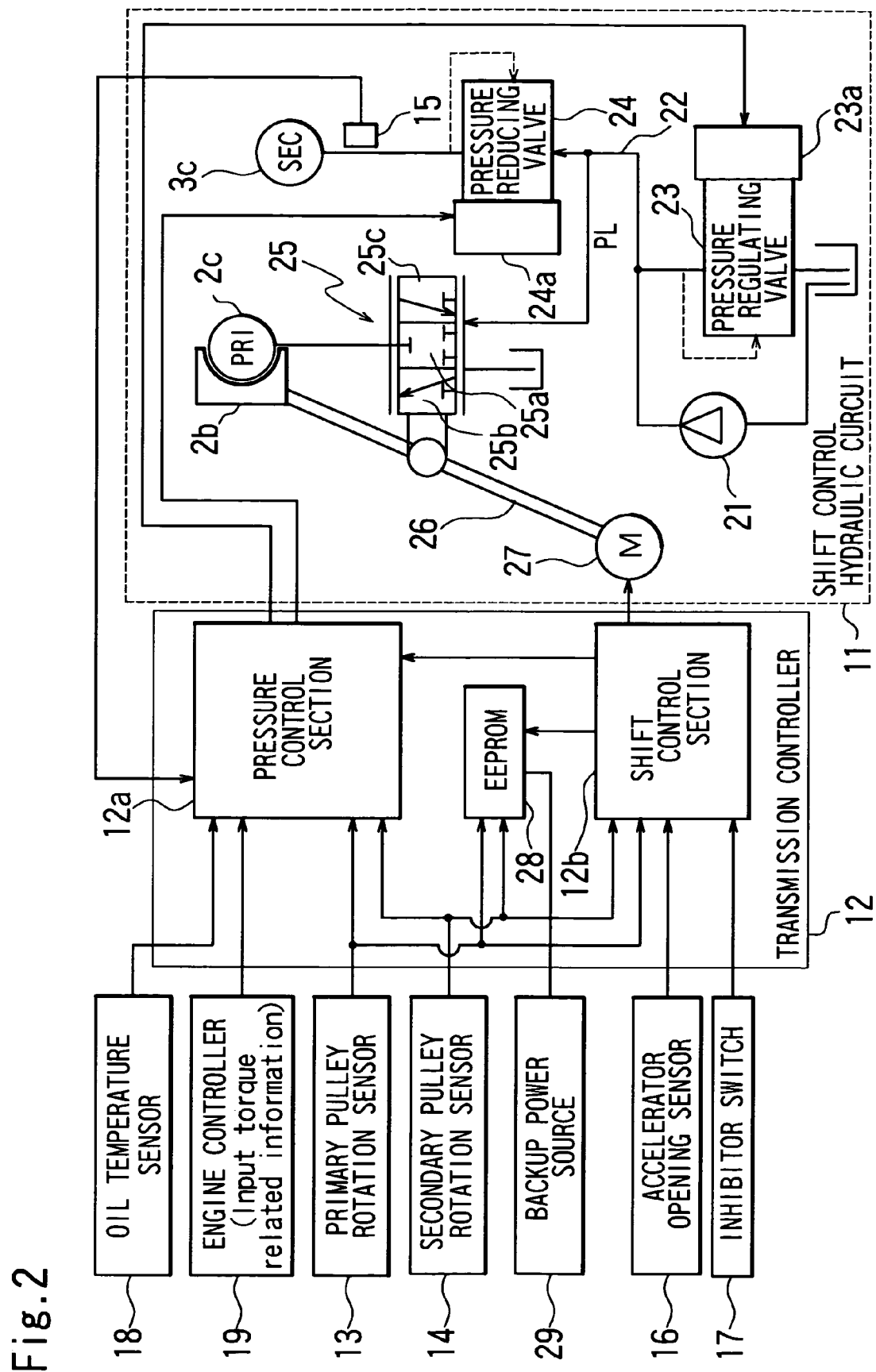
FIG. 2 is a diagram showing a detail of a shift control system for a V-belt type continuously variable transmission.

Next, controls performed in the shift control hydraulic circuit 11 and the transmission controller 12 will be explained with reference to FIG. 2.

The shift control hydraulic circuit 11 is provided with an oil pump 21 driven by the engine, employs working fluid supplied from the oil pump 21 to an oil passage 22 as medium and regulates the working fluid to a predetermined line pressure PL with a pressure regulator valve (P.Reg valve) 23. The line pressure PL of the oil passage 22 is regulated by a pressure reducing valve 24 and supplied to the secondary pulley chamber (SEC) 3c as the secondary pulley pressure Psec on the one hand and is regulated by a shift control valve 25 and supplied to the primary pulley chamber (PRI) 2c as the primary pulley pressure Ppri on the other hand. The pressure regulator valve 23 controls the line pressure PL with a drive duty applied to a solenoid 23a, and the pressure reducing valve 24 controls the secondary pulley pressure Psec with a drive duty applied to a solenoid 24.

The shift control valve 25 has a neutral position 25a, a pressure increasing position 25b and a pressure reducing position 25c and is connected to the middle of a shift link 26 to change these valve positions. A step motor (M) 27 as a shift actuator is connected to one end of the shift link 26, the other end of which is connected to the movable flange 2b of the primary pulley. The step motor 27 is driven to an operating position advancing from a reference position by the number of step corresponding to a target gear ratio, and this driving of the step motor 27 causes the shift link 26 to displace with a portion connected to the movable flange 2b as a supporting point, thereby changing the shift control valve 25 from the neutral position 25a to the pressure increasing position 25b or the pressure reducing position 25c.

As a result, when the target gear ratio is set at a high speed side (upshift side), the line pressure PL is brought into communication with a primary pulley pressure Ppri side, and when the target gear ratio is set at a low speed side (downshift side), on the other hand, the primary pulley pressure Ppri is brought into communication with a drain side. Thereby, the primary pulley pressure Ppri is increased by using the line pressure PL as an original pressure or reduced by the drain to change differential pressure between the primary pulley pressure Ppri and the secondary pulley pressure Psec, so that an upshift to a Hi-side gear ratio or a downshift to a Lo-side gear ratio is established and a shift operation toward the target gear ratio is performed.

Progress of the aforementioned gear shift is fed back to the shift link 26 through the movable flange 2b of the primary pulley, and the shift link 26 is displaced with the portion connecting with the step motor as a support in a direction where the shift control valve 25 is returned from the pressure increasing position 25b or the pressure reducing position 25c to the neutral position 25a. Thereby, when the target gear ratio is achieved, the shift control valve 25 is returned to the neutral position 25a, and the target gear ratio can be held. When the pulley is placed at the lowest position Lo, capacity of transmission torque of the V-belt 4 can be retained since a not-shown mechanical stopper gives reaction force to the pulley regardless of presence or absence of the primary pulley pressure Ppri.

The transmission controller 12 determines a solenoid drive duty of the pressure regulator valve 23, a solenoid drive duty of the pressure reducing valve 24 and a shift command to the step motor 27, as well as controlling supply of engagement hydraulic pressure to the forward clutch 7b and the backward brake 7c which are shown in FIG. 1. This transmission controller 12 is constituted by a pressure controlling section 12a and a shift control section 12b as shown in FIG. 2. The pressure controlling section 12a determines a solenoid drive duty of the pressure regulator valve 23 and a solenoid drive duty of the pressure reducing valve 24, and the shift control section 12b determines a drive step number Astep of the step motor 27 as described below.

The shift control section 12b determines a target input speed on the basis of a predetermined shift map by using a vehicle speed that can be determined from the secondary pulley revolution Nsec and an accelerator pedal depression amount APO, and determines a target gear ratio corresponding to driving states (vehicle speed and accelerator pedal depression amount APO) by dividing the target input speed by the secondary pulley revolution Nsec.

Next, the shift control section 12b calculates an actual gear ratio (achieved gear ratio) by dividing the primary pulley revolution Npri by the secondary pulley revolution Nsec and determines a gear ratio command for gradually bringing the actual gear ratio close to the target gear ratio at a target shift speed while carrying out disturbance compensation according to a difference between the actual gear ratio and the target gear ratio. Then, the shift control section 12b determines a step number Astep of the step motor 27, that is, a operating position of the step motor 27, for realizing this gear ratio command and transmits this step number to the step motor 27, whereby the target gear ratio can be achieved with the aforementioned shift operation.

Moreover, the transmission controller 12 is provided with an EEPROM 28 and stores a value of the actual gear ratio determined from the revolution Npri of the primary pulley 2 and the revolution Nsec of the secondary pulley 3 which are inputted from the primary pulley rotation sensor 13 and the secondary pulley rotation sensor 14, respectively, and stores the operating position of the step motor 27 which is commanded by the shift control section 12b. To the EEPROM 28, there is connected a backup power source 29, and the EEPROM 28 receives electric power supply from the backup power source 29 even when the power source of the vehicle is turned off and stores the actual gear ratio and the operating position of the step motor 27 at the time of turning off the power source of the vehicle as pulley information.

Figure 3:
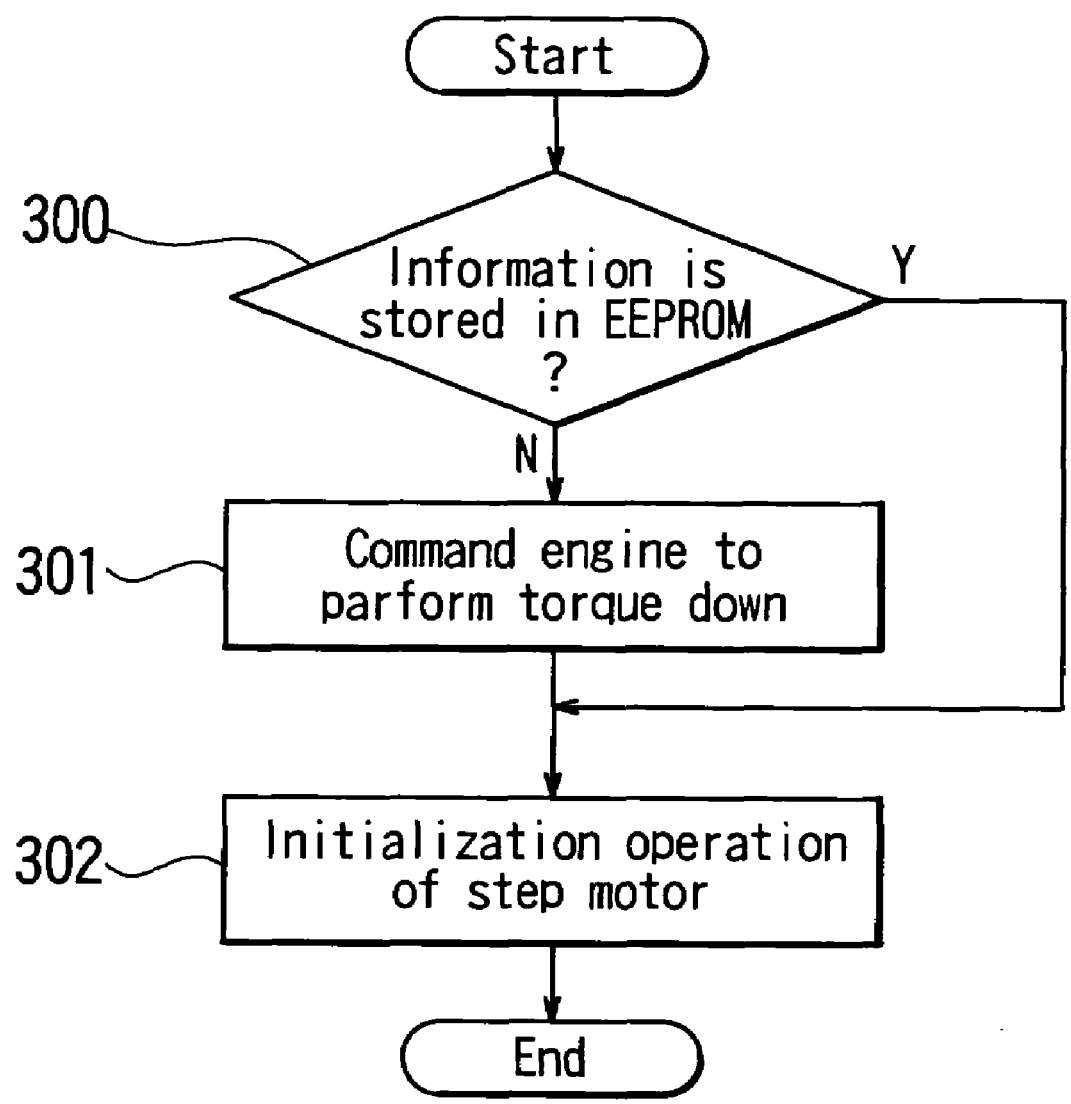
FIG. 3 is a flowchart showing a flow of a torque-down control performed by a shift controller during initialization operation of a step motor.

Next, initialization operation of the step motor 27 performed by the shift controller 12 will be described with reference to FIG. 3.

When the initialization operation of the step motor 27 is performed at the time of starting the engine of the vehicle or during stoppage of the vehicle, the shift controller 12 determines, in a step 300, whether pulley information of the V-belt type continuously variable transmission 1 is stored in the EEPROM 28.

When the pulley information is not stored in the EEPROM 28, the shift controller 12 commands the engine controller 19 to perform torque down of the engine at a step 301. By this torque down command performed by the engine controller 19, a maximum output torque of the engine is limited to 50 Nm for example.

In a step 302, the initialization operation of the step motor 27 is performed in order to correct difference between the operating position of the step motor 27 for stroking the shift control valve to a position corresponding to a predetermined shift command value and a command value to the step motor 27.

When it is determined in the step 300 that the pulley information is stored in the EEPROM 28, on the other hand, the routine proceeds to the step 302 directly, and the initialization operation of the step motor 27 is performed.

The torque down control of the engine performed before the initialization operation of the step motor 27 in case the pulley information is not written in the EEPROM 28 is terminated after the backup power source 29 is repaired at an automobile dealer, or in case the pulley information is normally written in the EEPROM 28 when the power source of the vehicle is again turned on after the power source is turned off.

In this embodiment, the step motor 27 constitutes a shift actuator according to the present invention, and the EEPROM 28 constitutes a storing section according to the present invention. Moreover, the step 300 constitutes a storage determining means according to the present invention, and the step 301 and the engine controller 19 constitute a torque limiting means according to the present invention.

This embodiment is thus constituted, and in case the pulley information are not stored in the EEPROM 28 because of the trouble of the backup power source 29 when the initialization operation of the step motor 27 is performed, the output torque of the engine is limited. Thereby, even when the accelerator pedal is depressed during the initialization operation of the step motor 27 in which a sufficient primary pulley pressure cannot be ensured, torque to be inputted to the V-belt type continuously variable transmission 1 is reduced since the output torque of the engine 5 is limited, and slippage of the V-belt 4 does not occur between the pulleys 2, 3.

Moreover, in case the vehicle is stopped in a state where a pulley ratio of the V-belt type continuously variable transmission 1 is set at a Hi (high speed side) due to a sudden stop of the vehicle, even if the accelerator is depressed while the initialization operation of the step motor 27 is started and the primary pulley pressure is drained, the output torque of the engine 5 is limited, and thereby the slippage of the V-belt 4 due to shortage of the primary pulley pressure does not occur.

Further, since the initialization operation of the step motor 27 is performed in a restart of the engine or stoppage of the vehicle, difference between the operating position of the step motor 27 and the command value is corrected in each case, and gear stage (gear ratio) of the V-belt continuously variable transmission 1 can be set correctly.

In the aforementioned embodiment, there is described an example in which the output torque of the engine is directly controlled, but this torque limitation may be performed by limiting torque inputted to the primary pulley. That is, this control may be performed with a torque converter disposed between the engine and the primary pulley, and in case a clutch or motor is disposed between the engine and the primary pulley, this torque control may be performed using them.

The entire contents of Japanese Patent Application No. 2003-50806(filed Feb. 27, 2003) are incorporated herein by reference.

Although the invention has been described above by reference to certain embodiments of the invention, the invention is not limited to the embodiments described above. Modifications and variations of the embodiment described above will occur to those skilled in the art, in light of the above teachings. The scope of the invention is defined with reference to the following claims.

What is claimed is:

1. A torque controlling system for use with a V-belt type continuously variable transmission for a vehicle in which a V-belt is wound between a primary pulley of an input side connected to an engine and a secondary pulley of an output side, a primary pulley pressure acting on the primary pulley and a secondary pulley pressure acting on the secondary pulley are generated respectively by using a line pressure as an original pressure, and a shift actuator is set to an operating position corresponding to a target gear ratio, whereby a differential pressure is generated between the primary pulley pressure and the secondary pulley pressure to change widths of V-shaped grooves of the primary pulley and the secondary pulley so that an actual gear ratio that is obtained from speed ratios of the primary pulley and the secondary pulley becomes equal to the target gear ratio, comprising:

a storing section for storing a pulley information immediately before the vehicle is stopped;

storage determining means for determining whether the pulley information is stored in the storing section, and torque limiting means for performing a limitation of an input torque to the primary pulley, wherein in case the storage determining means determines that the pulley information is not stored in the storing section before an initialization operation to set the shift actuator to a reference position is performed, the limitation of the input torque to the primary pulley is performed by the torque limiting means.

2. An engine torque controlling system according to claim 1, wherein the input torque to the primary pulley is equal to an output torque of the engine.

3. An engine torque controlling system according to claim 1 or 2, wherein the pulley information includes at least one of a gear ratio of the V-belt type continuously variable transmission and the operating position of the shift actuator.

4. An engine torque controlling system according to one of claims 1 or 2, wherein the initialization operation of the shift actuator is performed when the engine is started or when the vehicle is stopped.

5. An engine torque controlling system according to claim 3, wherein the initialization operation of the shift actuator is performed when the engine is started or when the vehicle is stopped.

* * * * *